(12) United States Patent
Lee et al.

(10) Patent No.: US 9,346,444 B2
(45) Date of Patent: May 24, 2016

(54) BOOSTER ASSEMBLY FOR VEHICLE (75) Inventors: Sung Je Lee, Seoul (KR); Young Jun Son, Pyeongtaek-si (KR); Chang Bok Ko, Namyangju-Si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 875 days.

(21) Appl. No.: 13/599,846

(22) Filed: Aug. 30, 2012

(65) Prior Publication Data
US 2013/0055710 A1 Mar. 7, 2013

(30) Foreign Application Priority Data

Aug. 30, 2011 (KR) .......................... 10-2011-0086899

(51) Int. Cl.
*F15B 7/00* (2006.01)
*B60T 13/567* (2006.01)

(52) U.S. Cl.
CPC .................................... *B60T 13/567* (2013.01)

(58) Field of Classification Search
CPC .............................. B60T 13/567; B60T 13/565
USPC .............................................. 92/169.2, 169.3
See application file for complete search history.

(56) References Cited

U.S. PATENT DOCUMENTS

| 4,286,501 A | 9/1981 | Thomas et al. | |
| 4,416,191 A * | 11/1983 | Takeuchi et al. | 92/165 PR |
| 5,410,880 A | 5/1995 | Schluter | |
| 6,295,919 B1 | 10/2001 | Leboisne | |
| 7,331,275 B2 * | 2/2008 | Sexton et al. | 92/169.3 |
| 7,712,515 B2 * | 5/2010 | Sulak et al. | 164/222 |

FOREIGN PATENT DOCUMENTS

EP 1388478 A1 2/2004

OTHER PUBLICATIONS

Korean Office Action issued in Korean Application No. 10-2011-0086899 mailed Mar. 27, 2013.
Chinese Office Action issued in Chinese Application No. 201210315161.0 dated Apr. 28, 2014, w/English translation.

* cited by examiner

*Primary Examiner* — Nathaniel Wiehe
*Assistant Examiner* — Logan Kraft
(74) *Attorney, Agent, or Firm* — McDermott Will & Emery LLP (57) ABSTRACT

A booster assembly includes a booster provided at an engine room partitioned from a passenger compartment by a partition plate, a master cylinder disposed outwardly of a front side of the front cell, and fastening members to simultaneously mount the booster and master cylinder to the vehicle. Each fastening member includes a tube extending through the booster and having a front portion extending through a flange of the master cylinder, nuts fastened to respective front portions of the tubes, to fasten the master cylinder to the booster, through-bolts extending through respective tubes and the partition plate, to be mounted to the front portions of respective tubes, and a non-circular coupler formed at a rear portion of each tube, to prevent the tube from rotating when the corresponding nut is fastened to the tube. The rear cell is provided with a hole having a shape mating with the non-circular coupler.

8 Claims, 8 Drawing Sheets

BOOSTER ASSEMBLY FOR VEHICLE

CROSS-REFERENCE TO RELATED APPLICATIONS

This application claims the benefit of Korean Patent Application No. P2011-86899, filed on Aug. 30, 2011 in the Korean Intellectual Property Office, the disclosure of which is incorporated herein by reference.

BACKGROUND

1. Field

Embodiments of the present invention relate to a booster assembly for vehicles, which is used in a braking device of a vehicle, and is configured to achieve easy installation of a booster and a master cylinder in the vehicle.

2. Description of the Related Art

Generally, a booster assembly is adapted to generate high hydraulic pressure by small force, using a pressure difference between a suction pressure of a vehicle engine and atmospheric pressure. As show in FIG. 1, such a booster assembly includes a booster 10 to generate great force by small force, and a master cylinder 20 to convert the force generated from the booster 10 into a hydraulic pressure.

Figure 1:
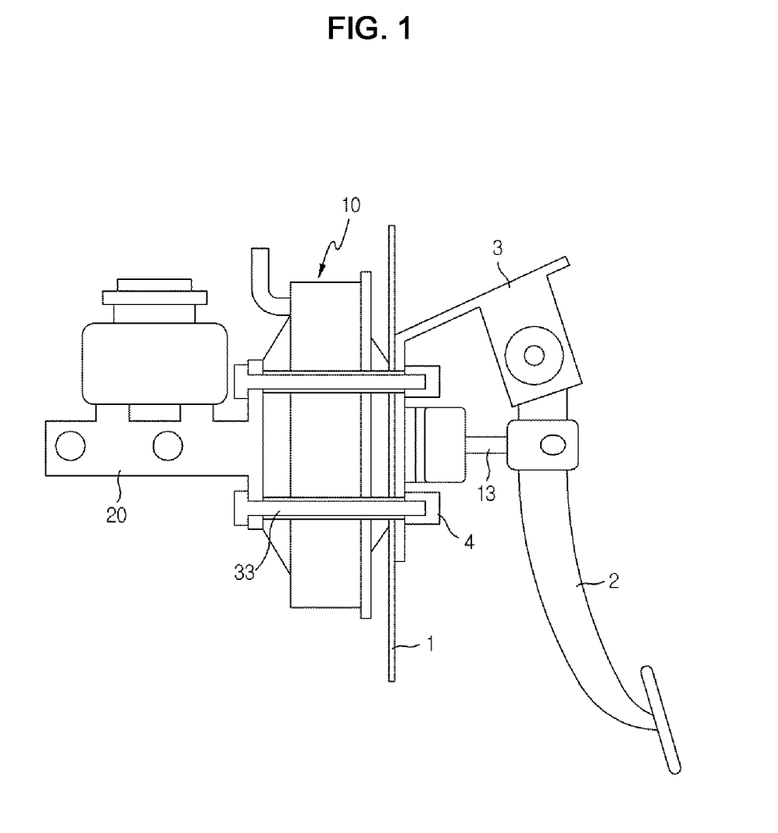
FIG. 1 is a view schematically illustrating a conventional booster assembly.

The booster 10 and master cylinder 20 are mounted to a partition plate 1, which partitions an engine room from a passenger compartment, for installation thereof in the vehicle. As shown in FIG. 1, the booster 10 and master cylinder 20 are disposed in the engine room. The booster 10 is operatively connected to a brake pedal 2. To this end, the booster 10 includes an input shaft 13 extending into the passenger compartment through the partition plate 1, to be connected to a brake pedal 2.

Thus, the above-mentioned booster assembly is mounted to the partition plate 1 by through-bolts 33. This will be described in more detail with reference to FIG. 2.

Figure 2:
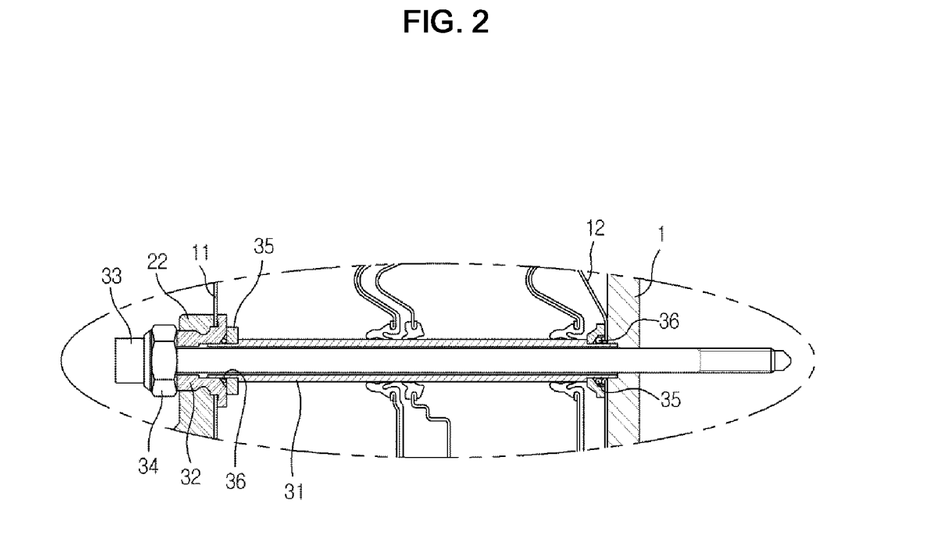
FIG. 2 is a view illustrating a state in which a booster and a master cylinder included in the conventional booster assembly are installed at a vehicle.

The reason why the through-bolts 33 are used in installation of the booster 10 and master cylinder 20 is to eliminate inconvenience occurring when rear bolts (not shown) are used in mounting of the booster 10 to the partition plate 1, because fastening of the rear bolts to a pedal bracket 3 using nuts should be carried out in the passenger compartment.

Hollow tubes 31 are provided within the booster 10. Front bolts 32 are coupled to respective front portions of the tubes 31, not only to mount the master cylinder 20, but also to support the tubes 31. The front bolts 32 are mounted to a front cell 11 in a cocked manner. Each tube 31 extends, at a rear portion thereof, through a rear cell 12.

The master cylinder 20 is provided with a flange 22 extending outwardly in a radial direction. The front bolts 32 are fitted in holes formed at the flange 22, respectively. A nut 34 is threadedly coupled to each front bolt 32, to fasten the master cylinder 20 to the booster 10.

Meanwhile, each through-bolt 33 extends through a corresponding one of the front bolts 32 and a corresponding one of the tubes 31, to be coupled to a pedal bracket 3 mounted to the partition plate 1.

In accordance with the above-mentioned structure, the booster 10 and master cylinder 20 are assembled in the engine room, and the through-bolts 33 are then inserted through the assembled booster 10 and master cylinder 20 such that they are fastened to nuts ("4" in FIG. 1) previously fixed to the pedal bracket 3. Accordingly, an enhancement in assemblability is achieved in that it is unnecessary to separately perform coupling of the through-bolts 33 in the passenger compartment.

In this case, however, structural complication and an increase in manufacturing costs may occur because the front bolts 32, which are installed not only to mount the master cylinder 20, but also to support the tubes 31, should be mounted to the booster 10 in a cocked manner.

Also, for separation of the master cylinder 20, it is necessary to unfasten the through-bolts 33 from the nuts 34. For this reason, there is inconvenience in separation.

In addition, since the tubes 31 and front bolts 32 extend through the booster 10, for installation thereof, it is necessary to additionally mount sealing members 36 and washers 35 to support the sealing members 36 between respective tubes 31 and the booster 10.

SUMMARY

Therefore, it is an aspect of the present invention to provide a booster assembly for a vehicle, in which through-bolts are directly fastened to respective tubes, through which the through-bolts extend, to eliminate cocking of front bolts, thereby simplifying the structure of the booster assembly and preventing the tubes from being rotated during fastening of nuts.

Another aspect of the present invention is to provide a booster assembly for a vehicle, which is capable of not only achieving convenient separation of a master cylinder, but also reducing the number of washers to maintain a seal between respective tubes, which are used to mount the booster assembly, and a booster.

Additional aspects of the invention will be set forth in part in the description which follows and, in part, will be obvious from the description, or may be learned by practice of the invention.

In accordance with one aspect of the present invention, a booster assembly for a vehicle for generating high hydraulic pressure by a small force, using a pressure difference between a suction pressure of an engine of the vehicle and atmospheric pressure includes a booster provided at an engine room partitioned from a passenger compartment by a partition plate, the booster including a front cell and a rear cell, which are sealably coupled, a master cylinder disposed outwardly of a front side of the front cell of the booster, the master cylinder converting force generated from the booster into a hydraulic pressure, and a fastening member to simultaneously mount the booster and the master cylinder to the vehicle, wherein the fastening member includes a tube extending through the booster while having a hollow structure extending in a longitudinal direction of the tube, the tube having a front portion extending through a flange of the master cylinder, a nut fastened to the front portion of the tube, to fasten the master cylinder to the booster, a through-bolt extending through the tube such that the through-bolt extends through the partition plate, to be mounted to the front portion of the tube, and a non-circular coupler formed at a rear portion of the tube, to prevent the tube from rotating when the nut is fastened to the tube, wherein the rear cell is provided with a hole, through which tube extends, the hole having a shape mating with a shape of the non-circular coupler.

The tube may be provided, at the rear portion thereof, with a plate extending in a radial direction around an outer circumferential surface of the tube and contacting an inner surface of the rear cell.

The plate may be formed, at a surface thereof facing the rear cell, with a seat to receive a sealing member having an O-ring shape.

The non-circular coupler may be axially protruded outwardly of the plate such that the non-circular coupler is fitted in the hole of the rear cell when the plate contacts the inner surface of the rear cell.

The tube may be provided, at the front portion thereof, with a first coupler to be coupled with the master cylinder, and a second coupler to be threadedly coupled with the nut.

The first and second couplers may be formed to have a stepped structure such that the first and second couplers have outer diameters sequentially reduced from an outer diameter of the tube or are formed to have an identical outer diameter.

The through-bolt may have a head portion having a smaller diameter than the outer diameter of the first coupler.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the preferred embodiments of the present invention, examples of which are illustrated in the accompanying drawings. It should be understood that the terms used in the specification and appended claims should not be construed as limited to general and dictionary meanings but be construed based on the meanings and concepts according to the spirit of the present invention on the basis of the principle that the inventor is permitted to define appropriate terms for best explanation. The preferred embodiments described in the specification and shown in the drawings are only illustrative and are not intended to represent all aspects of the invention, such that various equivalents and modifications can be made without departing from the spirit of the invention.

Figure 3:
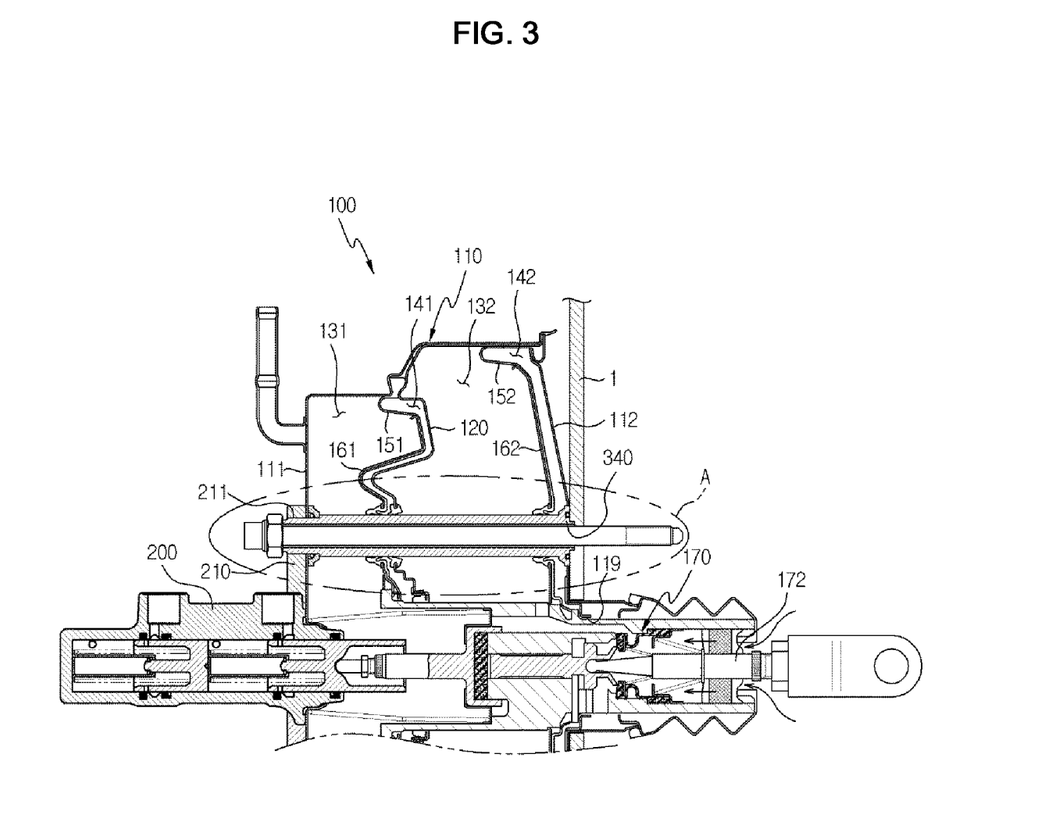
FIG. 3 is a view schematically illustrating a booster assembly for a vehicle according to an exemplary embodiment of the present invention.
Figure 4:
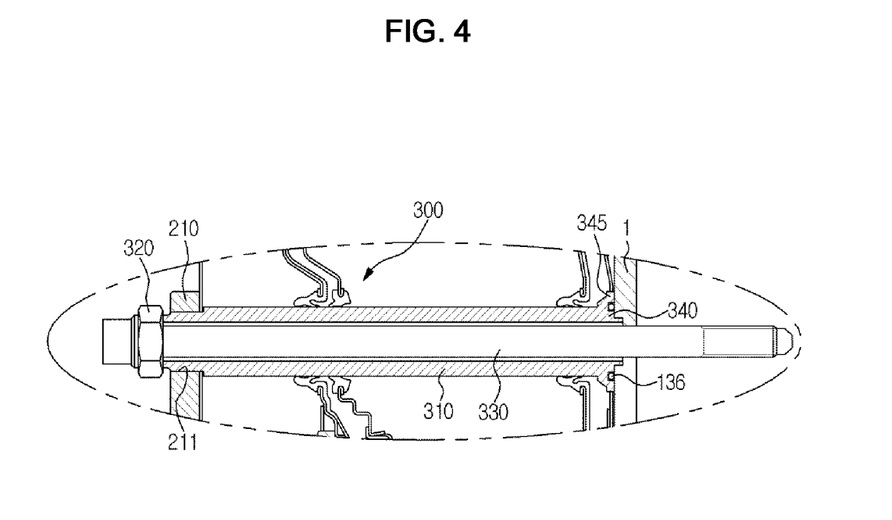
FIG. 4 is an enlarged view corresponding to a portion "A" in FIG. 3.
Figure 5:
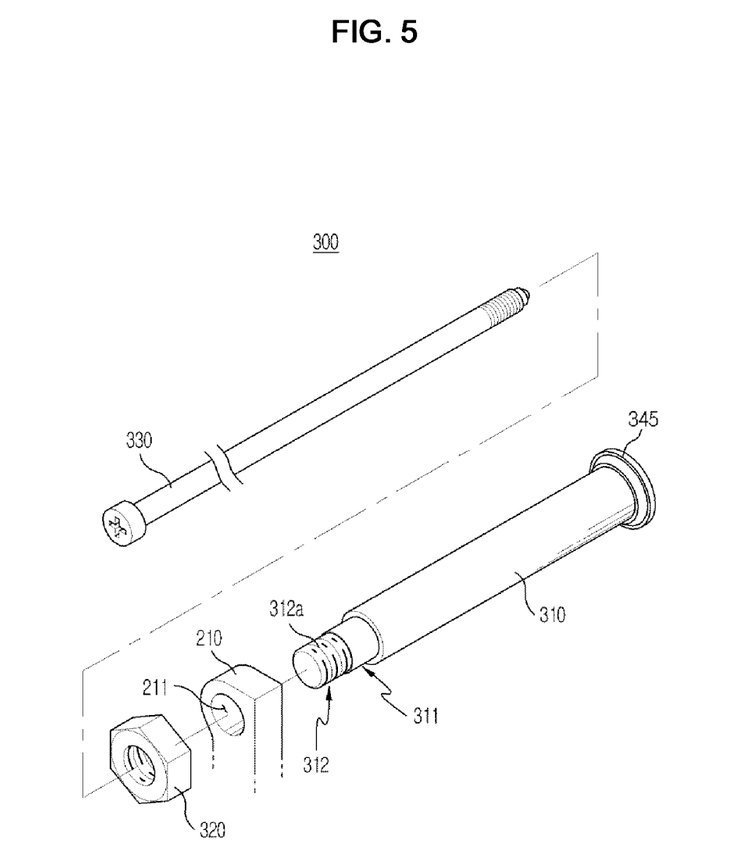
FIG. 5 is an exploded perspective view illustrating a fastening member provided at the vehicle booster assembly according to the illustrated embodiment of the present invention.

FIG. 3 is a view schematically illustrating a booster assembly for a vehicle according to an exemplary embodiment of the present invention. FIG. 4 is an enlarged view corresponding to a portion "A" in FIG. 3. FIG. 5 is an exploded perspective view illustrating a fastening member provided at the vehicle booster assembly.

Referring to FIGS. 3 to 5, the vehicle booster assembly includes a booster 100 to generate great force by small force, using a pressure difference between a vacuum pressure and atmospheric pressure, a master cylinder 200 installed at the booster 100, to generate a hydraulic force by the force generated from the booster 100, and fastening members 300 to mount the booster 100 and master cylinder 200 to a vehicle.

The booster 100 includes a casing 110 including a front cell 111 and a rear cell 112, which are sealably coupled, and an intermediate plate 120 to partition the interior of the sealed casing 110 into a front space and a rear space. The booster 100 also includes diaphragms 151 and 152 respectively installed in the front and rear spaces partitioned by the intermediate plates 120, and power pistons 161 and 162 respectively installed in the front and rear spaces partitioned by the intermediate plates 120. By the diaphragm 151 and power piston 161, the front space is partitioned into a constant pressure chamber 131 and a variable pressure chamber 141. Also, the rear space is partitioned into a constant pressure chamber 132 and a variable pressure chamber 142 by the diaphragm 152 and power piston 162.

An opening 119 is centrally formed through a rear wall of the casing 110. A valve device 170 is installed at the opening 119. The valve device 170 moves in accordance with operation of an input shaft 172 linked to a brake pedal (not shown) between a position where the valve device 170 connects each of the constant pressure chambers 131 and 132 and a corresponding one of the variable pressure chambers 141 and 142 and a position where the valve device 170 connects each of the variable pressure chambers 141 and 142 and the atmosphere, in order to generate a pressure difference between each of the constant pressure chambers 131 and 132 and a corresponding one of the variable pressure chambers 141 and 142. The pressure difference generated in accordance with operation of the input shaft 172 is transmitted to an output shaft which, in turn, pushes a piston (not shown) included in the master cylinder 200 fixed to an outer surface of a front portion of the front cell 111, thereby generating a braking force.

The master cylinder 200 has a cylindrical shape closed at one end thereof while being opened at the other end thereof. The master cylinder 200 is configured to receive force from the output shaft, and thus, to generate a hydraulic pressure. Such a configuration of the master cylinder 200 is well known in the technical field associated with master cylinders and, as such, no detailed description thereof will be given.

Meanwhile, the master cylinder 200 is formed with a flange 210 to enable the master cylinder 200 to be fastened to the booster 100 by the fastening members 300. The flange 210 is formed with holes 211, through which tubes 310 will extend. The tubes 310 will be described later.

When the above-described booster 100 and master cylinder 200 are installed at the vehicle, they are mounted to a partition plate 1, which generally partitions an engine room and a passenger compartment in the vehicle. The input shaft 172 and a rear portion of the valve device 170 extend into the passenger compartment through the partition plate 1 such that the input shaft 172 can be connected to a brake pedal (not shown). In this case, the booster 100 and master cylinder 200 are disposed in the engine room while being mounted to the partition plate 1 by the fastening members 300.

In accordance with an embodiment of the present invention, each fastening member 300 includes a tube 310 extending through the booster 100 while having a hollow structure, a nut 320 fastened to a front portion of the tube 310, a through-bolt 330 extending through the tube 310 such that it extends through the partition plate 1, for fastening thereof, and a non-circular coupler 340 formed at a rear portion of the tube 310, to prevent the tube 310 from rotating when the nut 320 is fastened to the tube 310.

The tube 310 has a hollow cylindrical shape while having a predetermined length. The tube 310 extends through the booster 100 such that it is protruded forwardly of the front cell 111. The front portion of the tube 310 extends through a corresponding one of the holes 211 of the flange 210 and, as such, the nut 320 is coupled to the front portion of the tube 310. In detail, the front portion of the tube 310 includes a first coupler 311 to be coupled with the flange 210 of the master cylinder 200, and a second coupler 312 to be coupled with the nut 320. The second coupler 312 is formed, at an outer circumferential surface thereof, with threads 312a to be threadedly coupled with the nut 320.

The first coupler 311 and second coupler 312 may be formed to have a stepped structure such that they have outer diameters sequentially reduced from the outer diameter of a portion of the tube 310 disposed within the booster 100. Alternatively, the first coupler 311 and second coupler 312 may be formed to have the same outer diameter. Accordingly, the first coupler 311 may be easily fitted in the hole 211 of the flange 210 of the master cylinder 200 via the second coupler 312. In this state, the nut 320 is fastened to the second coupler 312, to prevent the flange 210 from being separated from the second coupler 312. Thus, the master cylinder 200 is fastened to the booster 100. In this state, the through-bolts 330 are installed to extend through respective tubes 310 such that they extend through the partition plate 1 in order to mount the booster 100 and master cylinder 200 to the vehicle.

Each through-bolt 330 has a smaller diameter than the outer diameter of the first coupler 311. In particular, each through-bolt 330 may have, at a head portion thereof, a smaller diameter than the outer diameter of the first coupler 311 and equal to or smaller than the outer diameter of the second coupler 312. In this case, the master cylinder 200 may be easily separated upon replacement thereof, only through removal of the nuts 320. That is, once the nuts 320 are removed, the master cylinder 200 may be easily separated from the booster 100 because the inner diameter of the hole 211 corresponding to the outer diameter of the first coupler 311 is greater than the diameter of the through-bolt 330, Since the front and rear portions of each tube 310 are not fixed to the booster 100 after extending through the front cell 111 and rear cell 112, respectively, the tube 310 may rotate when the nut 320 is fastened thereto. To this end, the non-circular coupler 340 is provided at the rear portion of the tube 310 in order to prevent rotation of the tube 310.

Figure 6:
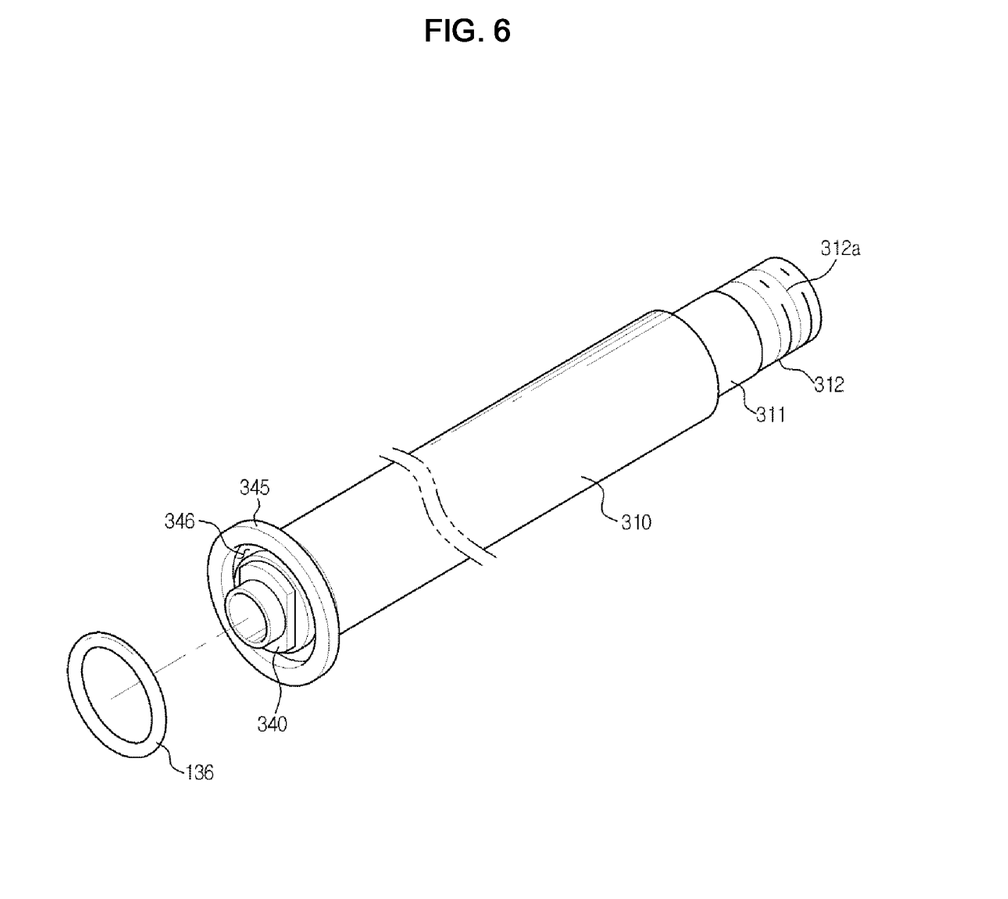
FIG. 6 is a perspective view illustrating a rear portion of a tube included in the fastening member of FIG. 5.
Figure 7:
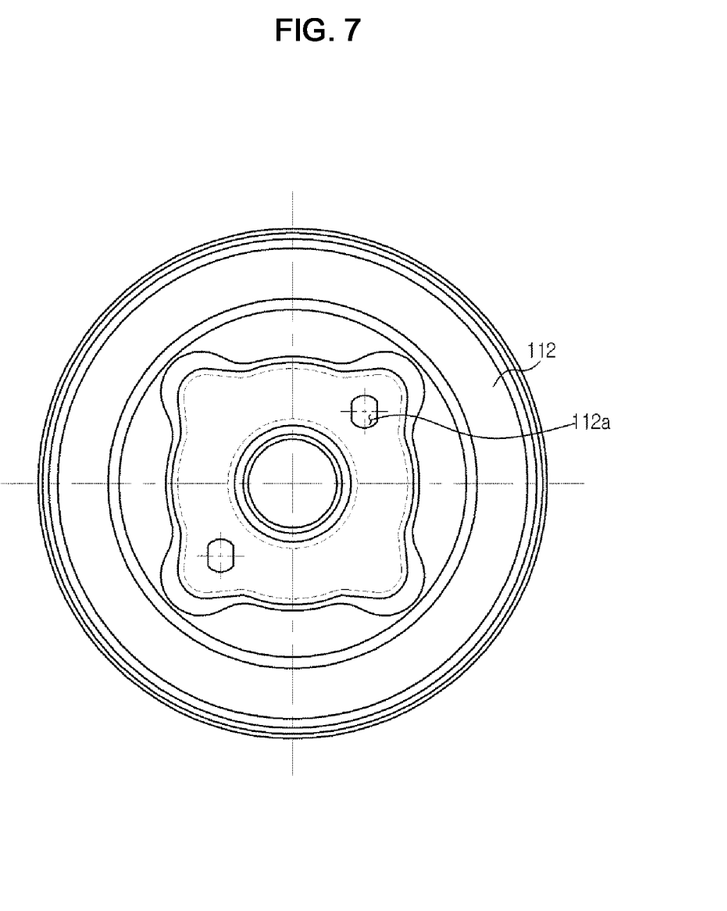
FIG. 7 is a plan view illustrating a rear cell of the vehicle booster assembly according to the illustrated embodiment of the present invention.
Figure 8:
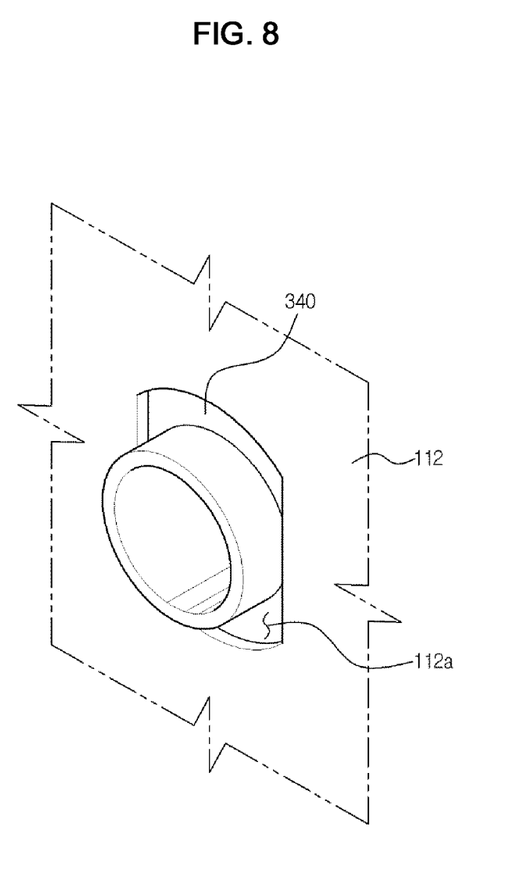
FIG. 8 is a perspective view illustrating a state in which the tube is installed at the rear cell of the vehicle booster assembly according to the illustrated embodiment of the present invention.

The non-circular coupler 340 is disposed at a position where the non-circular coupler 340 is fitted in a hole 112a formed through the rear cell 112 and, as such, the non-circular coupler 340 is engaged with the hole 112a of the rear cell 112. The hole 112a of the rear cell 112 has a shape mating with the non-circular coupler 340. That is, as shown in FIGS. 6 and 7, the non-circular coupler 340 has an oval shape having flat surfaces at opposite sides thereof. The hole 112a of the rear cell 112 is shaped to mate with an outer circumferential surface of the non-circular coupler 340 shaped as described above. Accordingly, when the non-circular coupler 340 is fitted in the hole 112a of the rear cell 112, as shown in FIG. 8, it may be possible to prevent the tube 310 from rotating. Thus, fastening of the nut 320 to the tube 310 may be easily achieved because rotation of the tube 310 is prevented. In accordance with fastening of the nut 320, the master cylinder 200 is fixed to the front surface of the booster 100.

Meanwhile, although the non-circular coupler 340 and hole 112a have been described and illustrated as having an oval shape with straight surfaces at opposite sides thereof, they are not limited to such a shape. The non-circular coupler 340 and hole 112a may have various mateable shapes such as a triangular shape and a rectangular shape, as long as they prevent rotation of the tube 310.

A plate 345 is provided at the rear portion of each tube 310. The plate 345 extends in a radial direction around an outer circumferential surface of the tube 310. When the non-circular coupler 340 is fitted in a hole 112a formed through the rear cell 112, the plate 345 comes into contact with an inner surface of the rear cell 112. The plate 345 is formed with a seat 346 at a surface thereof facing the rear cell 112. A sealing member 136, which may be an O-ring, is fitted in the seat 346. That is, the seat 346 is formed around the non-circular coupler 340. When the tube 310 is installed at the booster 100 under the condition that the sealing member 136 has been fitted in the seat 346, it may be possible to provide an enhanced sealing effect between the tube 310 and the booster 100.

In this state, the plate 345 comes into contact with the inner surface of the rear cell 112, and the non-circular coupler 340 is fitted in the hole 112a of the rear cell 112. That is, the non-circular coupler 340 is formed such that it is axially protruded outwardly of a surface of the plate 345 contacting the inner surface of the rear cell 112.

By virtue of the plate 345 formed with the seat 346, as described above, it is unnecessary to install a support washer ("35" in FIG. 2) to maintain a seal between the rear cell 112 and each tube 310. Accordingly, it may be possible to achieve structural simplicity, and thus to achieve an enhancement in assemblability. Also, although not shown, a plate (not shown) having the same function and shape as those of the plate 345 may be formed at the front portion of the tube 310.

As described above, in the vehicle booster assembly according to the illustrated embodiment of the present invention, it may be possible to eliminate use of front bolts ("32" in FIG. 2) and cocking of the front bolts 32, which are required upon mounting of a conventional booster assembly to a vehicle. Also it is unnecessary to install a support washer ("35" in FIG. 2) to maintain a seal between each tube 310 and the booster 100. Accordingly, it may be possible to achieve structural simplicity, and thus to achieve an enhancement in assemblability while reducing assembly costs.

As apparent from the above description, in the vehicle booster assembly according to the embodiment of the present invention, the through-bolts are directly fastened to respective tubes, and the master cylinder is fastened to the tubes without using front bolts. Accordingly, it is possible to simplify the structure of the booster assembly, and thus to easily install the booster and master cylinder to the vehicle.

Also, it is possible to achieve separation of the master cylinder simply through separation of the nuts, and to reduce the number of washers to support the sealing members.

As a result, it is possible to reduce the number of constituent elements to be assembled and to simplify the assembly process, and thus to achieve a reduction in assembly costs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A booster assembly for a vehicle for generating high hydraulic pressure by a small force, using a pressure difference between a suction pressure of an engine of the vehicle and atmospheric pressure, comprising:

a booster provided at an engine room partitioned from a passenger compartment by a partition plate, the booster comprising a front cell and a rear cell, which are sealably coupled;

a master cylinder disposed outwardly of a front side of the front cell of the booster, the master cylinder converting force generated from the booster into a hydraulic pressure; and a fastening member to simultaneously mount the booster and the master cylinder to the vehicle, wherein the fastening member comprises:

a tube extending through the booster while having a hollow structure extending in a longitudinal direction of the tube, the tube having a front portion extending through a flange of the master cylinder;

a nut fastened to the front portion of the tube, to fasten the master cylinder to the booster; and a through-bolt extending through the tube such that the through-bolt extends through the partition plate, to be mounted to the front portion of the tube, wherein the tube includes a non-circular coupler integrally formed at a rear portion thereof to prevent the tube from rotating when the nut is fastened to the tube, wherein the rear cell is provided with a hole, through which the tube extends, the hole having a shape mating with a shape of the non-circular coupler, wherein the tube is provided, at the rear portion thereof, with a plate extending in a radial direction around an outer circumferential surface of the tube and contacting an inner surface of the rear cell, and wherein the plate is formed, at a surface thereof facing the rear cell, with a seat, which is grooved in from a front surface of the plate rearwards in the axial direction and has an outer diameter smaller than that of the plate such that an outer edge of the plate is in surface contact with the partition plate, to receive and surround a sealing member having an O-ring shape.

2. The booster assembly according to claim 1, wherein the non-circular coupler is axially protruded outwardly of the plate such that the non-circular coupler is fitted in the hole of the rear cell when the plate contacts the inner surface of the rear cell.

3. The booster assembly according to claim 1, wherein the tube is provided, at the front portion thereof, with a first coupler to be coupled with the master cylinder, and a second coupler to be threadedly coupled with the nut.

4. The booster assembly according to claim 3, wherein the first and second couplers have a stepped structure such that the first and second couplers have outer diameters sequentially reduced from an outer diameter of the tube.

5. The booster assembly according to claim 4, wherein the through-bolt has a head portion having a smaller diameter than the outer diameter of the first coupler.

6. The booster assembly according to claim 3, wherein the first and second couplers have an identical outer diameter.

7. The booster assembly according to claim 6, wherein the through-bolt has a head portion having a smaller diameter than the outer diameter of the first coupler.

8. The booster assembly according to claim 1, wherein the non-circular coupler has an oval shape with straight surfaces at opposite sides thereof.

* * * * *